United States Patent
Duffy (12) United States Patent (10) Patent No.: US 9,976,768 B2
(45) Date of Patent: May 22, 2018

(54) FIRE-RATED MODULAR DUCT ASSEMBLY SUITABLE FOR EXHAUSTING FLAMMABLE OR HAZARDOUS GASES, VAPOURS AND OTHER MATERIALS

(71) Applicant: DuraSystems, Vaughan (CA)

(72) Inventor: William Christopher Duffy, Ontario (CA)

(73) Assignee: DuraSystems, Ontario (CA)

( * ) Notice: Subject to any disclaimer, the term of this patent is extended or adjusted under 35 U.S.C. 154(b) by 0 days. days.

(21) Appl. No.: 15/406,150

(22) Filed: Jan. 13, 2017

(65) Prior Publication Data

US 2017/0130984 A1 May 11, 2017

Related U.S. Application Data (63) Continuation of application No. 14/734,391, filed on Jun. 9, 2015, now Pat. No. 9,557,071, which is a continuation of application No. 13/344,896, filed on Jan. 6, 2012, now Pat. No. 9,074,788.

(51) Int. Cl.

| F16L 9/14 | (2006.01) |
|---|---|
| F24F 13/02 | (2006.01) |
| E04F 17/04 | (2006.01) |
| F16L 25/00 | (2006.01) |
| F16L 59/14 | (2006.01) |

(52) U.S. Cl.
CPC .......... *F24F 13/0209* (2013.01); *E04F 17/04* (2013.01); *F24F 13/0263* (2013.01); *F24F 13/0281* (2013.01); *F16L 25/0009* (2013.01); *F16L 59/14* (2013.01)

(58) Field of Classification Search
CPC ....... F16L 59/14; F16L 9/003; F16L 25/0009; F24F 13/0209; F24F 13/0263; F24F 2221/30; E04F 17/04

USPC .......... 138/148, 149, 109, 170; 285/337.368, 285/424

See application file for complete search history.

(56) References Cited

U.S. PATENT DOCUMENTS

| 624,715 A | 5/1899 | Wenz |
|---|---|---|
| 1,986,965 A | 1/1935 | Harrison |
| 1,992,574 A | 2/1935 | Jenkins |
| 2,183,174 A | 12/1939 | Wiley |
| 2,226,523 A | 12/1940 | Peck |
| 2,857,931 A | 10/1958 | Lawton |
| 2,916,054 A | 12/1959 | Callan |
| 3,003,794 A | 10/1961 | Burley |

(Continued)

FOREIGN PATENT DOCUMENTS

| CA | 2357078 | 12/2002 |
|---|---|---|
| CA | 2450977 | 5/2005 |

(Continued)

OTHER PUBLICATIONS

Non-Final Office Action mailed in U.S. Appl. No. 13/344,896 dated Nov. 5, 2014.

*Primary Examiner* — Patrick F Brinson
(74) *Attorney, Agent, or Firm* — Workman Nydegger (57) ABSTRACT

A fire-rated exhaust duct system comprising a modular configuration or structure. The fire-rated exhaust duct system comprises a plurality of exhaust duct sections. Each of the exhaust duct sections is configured to be joined or connected with other exhaust duct sections in the field or at an installation site, e.g. in building housing a kitchen facility or a laboratory facility to form longer sections or runs for exhaust duct system.

13 Claims, 9 Drawing Sheets

(56) References Cited

U.S. PATENT DOCUMENTS

| | | |
|---|---|---|
| 3,123,880 A | 3/1964 | Barry et al. |
| 3,198,561 A | 8/1965 | Witt |
| 3,351,699 A | 11/1967 | Merckle |
| 3,512,805 A | 5/1970 | Glatz |
| 3,630,549 A | 12/1971 | Grimm |
| 3,800,846 A | 4/1974 | Kurz |
| 3,811,714 A | 5/1974 | Pintard |
| 3,923,326 A | 12/1975 | Mez |
| 3,929,166 A | 12/1975 | Westerheid |
| 4,133,566 A | 1/1979 | Miller |
| 4,162,093 A | 7/1979 | Sigmund |
| 4,380,188 A | 4/1983 | Nichols |
| 4,415,184 A | 11/1983 | Stephenson |
| 4,509,778 A | 4/1985 | Ardnoldt |
| 4,537,430 A | 8/1985 | Sullivan |
| 4,557,297 A | 12/1985 | Montanna |
| 4,572,553 A | 2/1986 | Geldner |
| 4,662,661 A | 5/1987 | Arnoldt |
| 4,725,083 A | 2/1988 | Schauer |
| 4,765,375 A | 8/1988 | Nakajima |
| 4,804,207 A | 2/1989 | Berchem et al. |
| 4,836,585 A | 6/1989 | Schauer |
| 4,859,320 A | 8/1989 | Beall, Jr. |
| 4,913,127 A | 4/1990 | Dugger |
| 4,940,264 A | 7/1990 | Mez |
| 4,951,716 A | 8/1990 | Tsunoda |
| 5,024,251 A | 6/1991 | Chapman |
| 5,067,278 A | 11/1991 | Lyons |
| 5,069,484 A | 12/1991 | McElroy |
| 5,103,549 A | 4/1992 | Meinig et al. |
| 5,133,580 A | 7/1992 | Meinig |
| 5,135,270 A | 8/1992 | Arnoldt |
| 5,165,189 A | 11/1992 | Besal |
| 5,171,184 A | 12/1992 | Saucier et al. |
| 5,219,403 A | 6/1993 | Murphy |
| 5,356,048 A | 10/1994 | Geiser |
| 5,378,028 A | 1/1995 | Issagholian-Havai et al. |
| 5,450,879 A | 9/1995 | Toben |
| 5,538,377 A | 7/1996 | Stewart et al. |
| 5,564,758 A | 10/1996 | Tiberio |
| 5,575,131 A | 11/1996 | Menchetti |
| 5,653,482 A | 8/1997 | Ficchi, Jr. |
| 5,673,947 A | 10/1997 | DeWaal |
| 5,753,855 A | 5/1998 | Nicoli |
| 5,775,414 A | 7/1998 | Graham |
| 5,865,478 A | 2/1999 | Lin |
| 5,898,132 A | 4/1999 | Lee |
| 5,901,502 A | 5/1999 | Rafalski et al. |
| 6,109,665 A | 8/2000 | Meinig |
| 6,143,984 A | 11/2000 | Auteri |
| 6,148,867 A | 11/2000 | Matthews et al. |
| 6,156,977 A | 12/2000 | Benito-Navazo |
| 6,188,024 B1 | 2/2001 | Benito-Navazo |
| 6,213,522 B1 | 4/2001 | Jacobsen et al. |
| 6,231,704 B1 | 5/2001 | Carpinetti |
| 6,412,519 B1 | 7/2002 | Goodhue |
| 6,460,573 B1 | 10/2002 | Fischer et al. |
| 6,471,256 B1 | 10/2002 | Fischer |
| 6,502,716 B1 | 1/2003 | Kolesar |
| 6,505,864 B1 | 1/2003 | Shuey |
| 6,547,287 B1 | 4/2003 | Shah et al. |
| 6,550,823 B1 | 4/2003 | Siegwart |
| 6,561,553 B1 | 5/2003 | Issagholian-Havai et al. |
| 6,758,502 B2 | 7/2004 | Mattson et al. |
| 6,848,720 B2 | 2/2005 | Carns et al. |
| 7,011,115 B1 | 3/2006 | Giovannini |
| 7,195,290 B2 | 3/2007 | Duffy |
| 7,501,576 B2 | 3/2009 | Gagliardi |
| 7,699,078 B1 | 4/2010 | Husmann |
| 8,178,781 B2 | 5/2012 | Duffy |
| 8,276,319 B2 | 10/2012 | Duffy |
| 8,397,765 B2 | 3/2013 | Jackson |
| 2002/0121778 A1 | 9/2002 | Tigerfeldt |
| 2003/0006611 A1 | 1/2003 | Shuey |
| 2003/0160452 A1 | 8/2003 | Mattson et al. |
| 2004/0178626 A1 | 9/2004 | Segreto |
| 2005/0116470 A1 | 6/2005 | Duffy |
| 2009/0050229 A1 | 2/2009 | Kim |

FOREIGN PATENT DOCUMENTS

| | | |
|---|---|---|
| CA | 2691316 | 7/2010 |
| CA | 2800362 | 7/2013 |
| FR | 2719347 | 4/1994 |
| GB | 2045321 | 3/1979 |
| GB | 2284989 | 6/1995 |
| JP | 8178404 | 7/1996 |

FIRE-RATED MODULAR DUCT ASSEMBLY SUITABLE FOR EXHAUSTING FLAMMABLE OR HAZARDOUS GASES, VAPOURS AND OTHER MATERIALS

CROSS-REFERENCE TO RELATED APPLICATIONS

This invention is a continuation of U.S. patent application Ser. No. 14/734,931, filed on Jun. 9, 2015, entitled "Fire-Rated Modular Duct Assembly Suitable for Exhausting Flammable or Hazardous Gases, Vapours and Other Materials," which is a continuation of U.S. patent application Ser. No. 13/344,896 (now U.S. Pat. No. 9,074,788), filed on Jan. 6, 2012, also entitled "Fire-Rated Modular Duct Assembly Suitable for Exhausting Flammable or Hazardous Gases, Vapours and Other Materials." The entire content of each of the foregoing patent applications is incorporated herein by reference.

BACKGROUND OF THE INVENTION

The present application relates to duct assembly, and more particularly, to a fire-rated modular duct assembly suitable for exhausting flammable or hazardous gases, vapour and the like.

Many processes in commercial and industrial facilities generate flammable or hazardous gases, vapors or particles. The hazardous material must be captured at the source and transported or moved through the facility (e.g. building) to a location where the material can be discharged, e.g. directly into the atmosphere, or into a collection or a treatment system within the building or exterior to the building.

In a typical facility, ventilation ducts are routed throughout the building. The ventilation ducts penetrate and cross fire separations, and typically comprise interior dampers installed within the fire separation section to prevent fire that penetrates the duct from travelling through the duct across the fire separators in the building. It will be appreciated that while such an implementation may be sufficient for the fire protection of ventilation ducts, ventilation or exhaust ducts for flammable or hazardous materials cannot be configured with fire dampers, so the duct itself must be fire-rated.

To be classified as a fire-rated duct, an exhaust duct must be capable of preventing the release of flammable materials from inside the duct and/or combustible materials adjacent the exterior of the exhaust duct from catching fire if a fire exists on the other side of the duct. In other words, a fire-rated duct must be capable of minimizing the transfer of heat through or across the duct walls. It is also desirable to maintain the wall thickness to a workable minimum.

Fire-rated ducts are typically found in installations such as commercial kitchens and laboratories.

In a commercial kitchen, the exhaust hoods are configured to capture grease laden air over deep fryers and grills, which is extremely flammable, and must be transported through the building to an exterior area where it can be safely discharged. Due to the flammable nature of the exhausted vapour, a minor fire, for example, in the kitchen could enter the exhaust duct and quickly spread throughout the duct system. As a result, any potential fire inside the duct system must be contained and thermal transfer through the duct walls limited to prevent ignition of adjacent combustible material in the kitchen or other areas of the building. In addition, the exhaust duct system must be capable of preventing the ignition of the grease laden air from a fire source in another part of the building and then spreading to the kitchen or other parts of the building where the exhaust duct system is routed.

In a laboratory installation, the exhaust system is configured to collect and exhaust chemical vapours, including vapours from chemicals with low flash points, and contain any fire inside the duct system, or prevent an external fire from igniting the vapour inside the duct system.

Known fire-rated exhaust duct systems are typically fabricated in sections, and the section are shipped to the installation location. At the installation location, the sections are welded together to form continuous conduits or conduit sections. Due to field conditions, the welding could be of poor work quality due to limited space and/or setup. This meant expensive rework and re-welding to seal leaks in the duct system during pressure testing. Conventional fire-rated duct systems typically required the installation of an additional gypsum fire-rated enclosure (approximately 10" thick) around the duct. In addition to requiring an additional step, the gypsum enclosure was typically constructed/installed by another trade.

In an attempt to overcome the known shortcomings in the art, chimney manufacturers introduced pre-fabricated fire-rated exhaust ducts based on a modification of existing chimney exhaust systems. While these pre-fabricated fire-rated exhaust ducts addressed shortcomings of existing systems, the characteristic round profile significantly limits the volume of air that can be vertically carried in conventional building footprints, and in a horizontal configuration, the round profile or cross section is often too large to fit into conventional ceiling space spaces or dimensions.

Accordingly, there remains a need for improvements in the art.

BRIEF SUMMARY OF THE INVENTION

The present invention comprises embodiments of a modular fire-rated duct system suitable for pre-fabrication and configured for assembly in the field.

According to an embodiment, the present invention provides a modular fire-rated exhaust duct assembly comprising: two or more exhaust duct modules; each of said exhaust duct modules having an inner duct liner and an outer casing, and a void being formed between at least a portion of space between said inner duct liner and said outer casing, said void being configured for receiving an insulation material, and including one or more insulation encapsulation sections configured to connect to said inner duct liner and said outer casing to contain said insulation material in said void; a first exterior flange connector, and one end of each of said exhaust duct modules being configured for receiving said first exterior flange connector; a second exterior flange connector, and another end of each of said exhaust duct modules being configured for receiving said second exterior flange connector; said first and said second exterior flange connectors being configured to form a field assembly junction for coupling respective ends of said exhaust duct modules to form a single exhaust duct run; and a joint encasement section configured to be field connectable to each of said exhaust duct modules and encase said junction.

According to another embodiment, there is provided an exhaust duct module configured to be assembled in the field to form a fire-rated exhaust duct assembly, said exhaust duct module comprising: an inner duct liner formed with a generally rectangular cross-section; an outer casing formed with a generally rectangular cross-section and being sized to substantially surround said inner duct liner; a first flange connector configured to be attached to one end of said inner duct liner and one end of said outer casing, and couple said inner duct liner to said outer casing; a second flange connector configured to be attached to one end of said inner duct liner and one end of said outer casing, and couple said inner duct liner to said outer casing; and said first flange connector and said second flange connector being configured to be field attachable to couple another exhaust duct assembly.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments according to the present application, and in which.

Like reference numerals indicate like or corresponding elements in the drawings.

DETAILED DESCRIPTION OF THE PREFERRED EMBODIMENT

Figure 1:
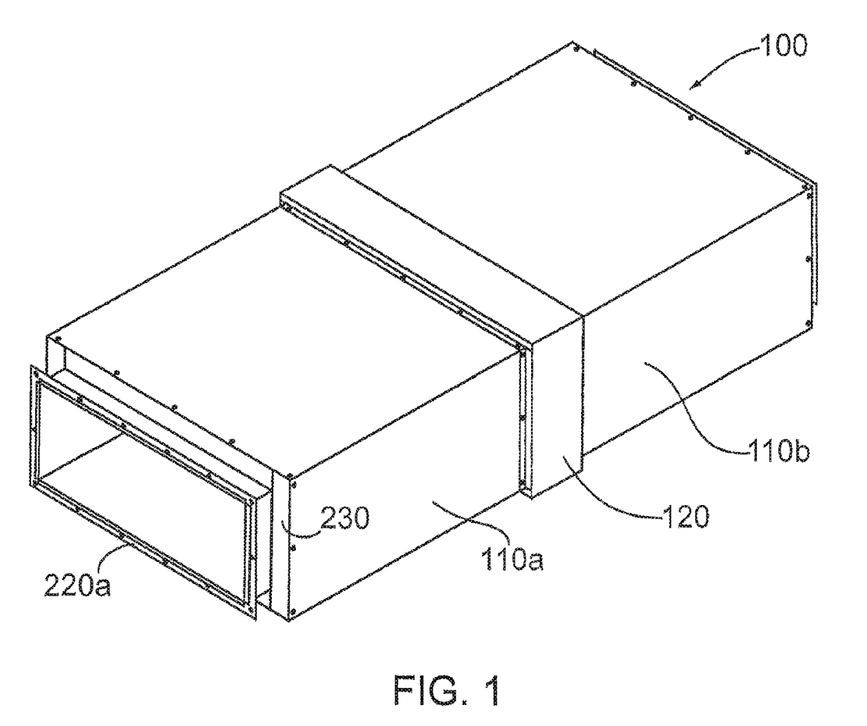
FIG. 1 is a perspective view of an exhaust duct system according to an embodiment of the present invention and comprising a rectangular configuration and two sections or modules.

Reference is first made to FIG. 1, which shows a fire-rated modular exhaust duct system or assembly according to an embodiment of the invention. The fire-rated modular exhaust duct is indicated generally by reference 100 and according to an embodiment comprises a plurality of exhaust duct sections or modules 110, indicated individually by references 110a and 110b, as shown in FIG. 1. The individual exhaust sections 110 are connected or coupled together with a mechanical joint indicated generally by reference 120 and described in more detail below. Embodiments of the modular fire-rated exhaust duct system or apparatus according to the present invention are suitable for installations or applications requiring fire-rated duct systems, such as exhaust duct systems for commercial applications, for instances, kitchens and restaurants, laboratories and other chemical or hazardous material processing facilities, as will be apparent to those skilled in the art.

Figure 2:
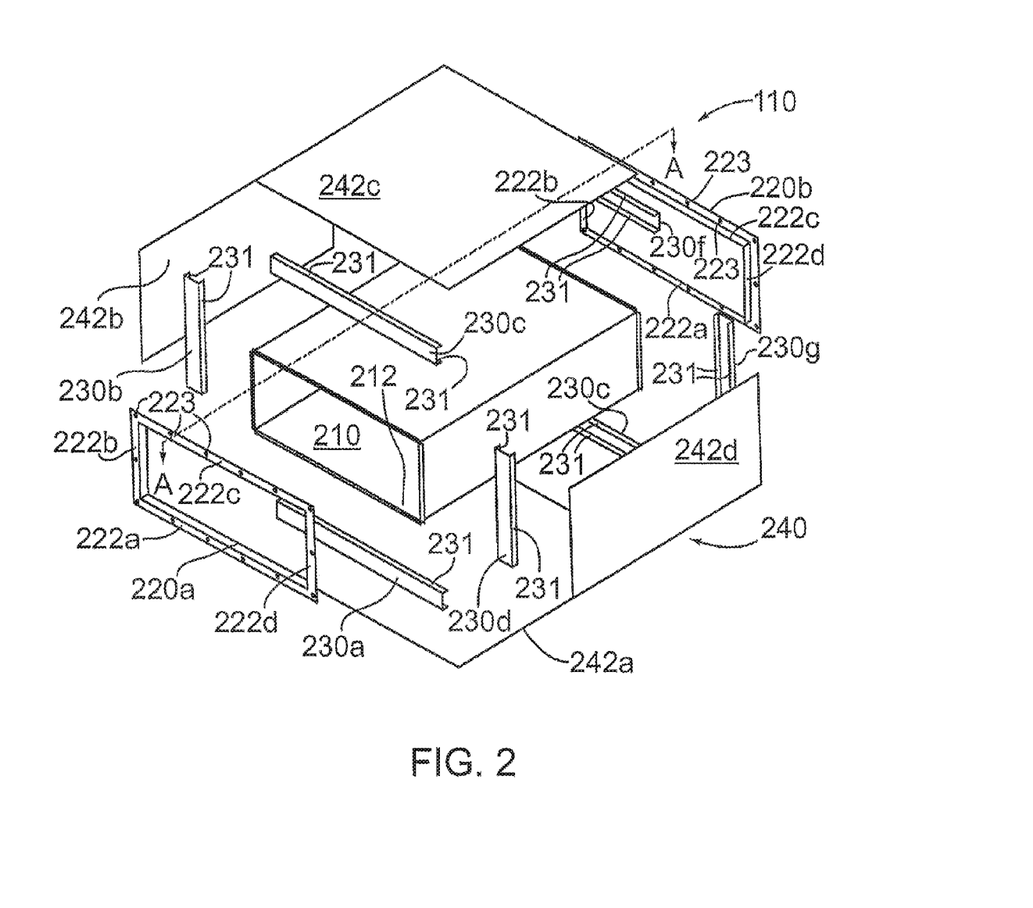
FIG. 2 is an exploded view of one the sections of FIG. 1.

Reference is next made to FIG. 2, which shows an exploded view of one of the exhaust duct modules or sections 110 according to an embodiment of the invention. The exhaust duct section 110 comprises an inner metallic duct 210, first and second external flange connectors 220 (indicated individually by references 220a and 220b), insulation encapsulation sections or caps 230 (indicated individually by references 230a, 230b, 230c, 230d, 230e, 230f and 230g), and an outer metallic casing 240. According to an embodiment, the outer metallic casing 240 comprises separate metallic sheets or sections indicated individually by references 240a, 240b, 240c and 240d. According to another embodiment, one or more sheets or sections could be formed together as single pieces and then joined or connected together with the other section(s).

As shown in FIGS. 2 and 4, the inner metallic duct 210 is formed with a flange indicated generally by reference 212. The flange 212 is configured to overlap a portion of the external flange connector 220. According to an exemplary implementation, the inner metallic duct 210 is fabricated from stainless, carbon or coated steels, and is formed into a tube with a square or rectangular profile or cross-section. According to requirements under the UL 2221 and ASTM E2336 standards, the minimum wall thickness for the inner metallic duct 210 is typically 18 gauge (ga) for stainless steel and 16 ga for carbon steels.

The inner metallic duct 210 can be fabricated or formed in a number of ways including: (1) forming a piece of metal into a tube; (2) forming two pieces of metal into "L" shaped sections and joining the two sections together to form a rectangle (or a square profile) tube; (3) forming a single piece of metal into a "U" shaped section and joining a flat piece of metal to the open end of the "U" shaped section; or (4) using four separate pieces or panels of steel and joining them to form a rectangular (or square) profile tube. The longitudinal joint or joints are continuously welded to provide a liquid and air tight seal between the edges of the panels. Other connection techniques, such as Pittsburgh type mechanical locks or pocket locks which are sealed with stitch welding can be utilized as will be understood by one skilled in the art. Such techniques can provide mechanical strength to pass the fire exposure tests.

The flange 212 (FIGS. 2 and 4) is formed at each transverse end of the inner metallic duct 210 and serves to define the duct section length. The flange 212 is formed at a right angle and provides a smooth flat surface for coupling adjacent duct sections and assisting in providing a liquid and air-tight surface, as described in more detail below.

Figure 4A:
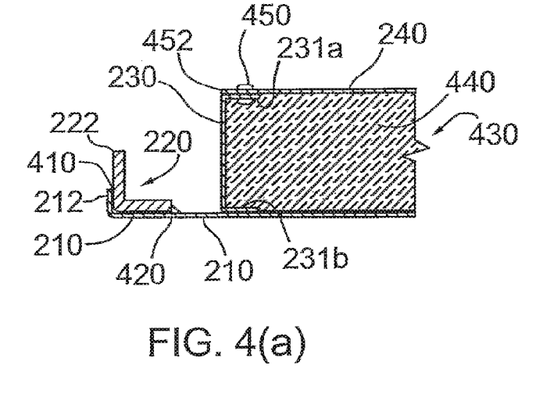
FIGS. 4(a) to 4(d) show alternate encapsulation configurations with varying thermal resistance characteristics according to embodiments of the present invention.

As shown in FIG. 4(a) the inner duct liner 210 and the flange 212 are connected or affixed to the external flange connector 220. The external flange connector 220 is fabricated from the same type of metal as the inner duct liner 210 so as to avoid the potential for galvanic action occurring between dissimilar metals. According to an embodiment, the external flange connector 220 is formed from four sections or pieces 222, indicated individually by references 222a, 222b, 222c and 222d, in FIG. 2. Each of the sections 222 comprises a flat metal strip formed into a right angle piece, or a section cut from hot rolled right angle structural steel. The sections 222 will typically have a thickness in the range of 0.125 to 0.250 inches to prevent the duct from collapsing from fire exposure. The thickness will also depend on the width and/or depth (i.e. length) of the duct section 110. As shown, each of the flange sections 222 includes a series of holes 223 (punched or drilled), for example, at 4" to 8" centers to provide openings for receiving respective bolts 224 (FIG. 8) which are secured by a respective nut 226 (FIG. 8) to connect adjacent duct sections 110 together, as described in more detail below. As shown in FIGS. 5(a) and 5(b), the flange sections 222 can be connected using a square joint as indicated generally by references 510 and 520, in order to assist in providing a liquid and air tight seal at the flange connection points for joining the duct sections 110. Or as shown in FIG. 5(c), the flange sections 222 can be connected utilizing a mitered joint as indicated generally by reference 530, in order to assist in providing a liquid and air tight seal at the flange connection points for joining the duct sections 110. According to an exemplary implementation, the external flange connector 220 is assembled around the flange end 212 of the inner duct 210 with the individual flange sections 222 being welded in place. For instance, the flange sections 222 are welded to inner duct 210 with either a continuous weld or a stitch weld where the external flange connector 220, i.e. the flange section 222, interfaces with the flange or return end 212, for example, at a point 410 and where the flange section interfaces with the inner duct 210 at a point 420, as shown in FIGS. 4(a) to 4(d).

Referring again to FIGS. 4(a) to 4(d), a space or void indicated by reference 430 is formed between the inner duct 210 and the outer metallic casing 240. As shown, the void 430 can be filled with a thermally resistant insulation material or gas or liquid indicated generally by reference 440. The thermal resistant material 440 is sealed or held inside the void 430 by the insulation encapsulation sections or caps 230 (230a, 230b, 230c and 230d as depicted in FIG. 2). The encapsulation sections or caps 230 are formed from flat metal pieces or strips having a thickness to provide sufficient strength to contain the insulation material in place, and also support the outer metallic casing 240 during exposure to fire. In a typical implementation, the encapsulation sections 230 have a thickness ranging from 16 ga to 24 ga.

Figure 3:
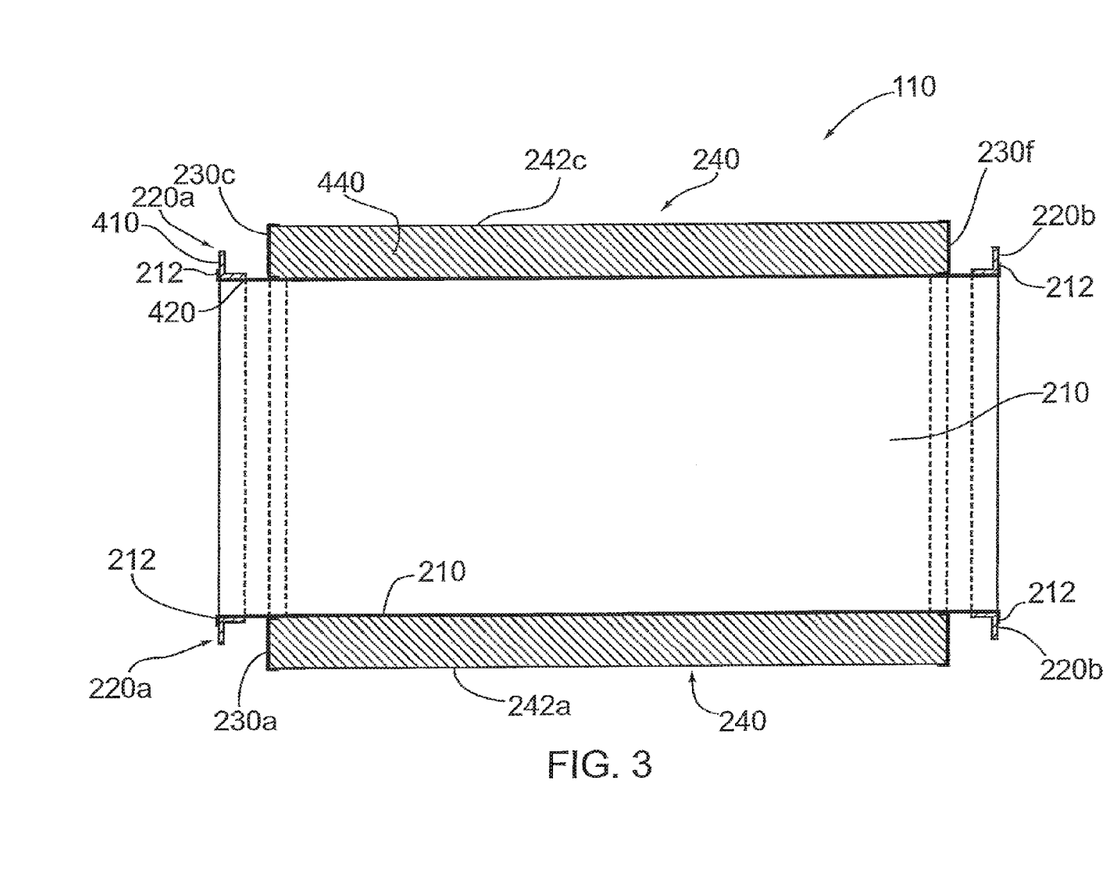
FIG. 3 is a longitudinal sectional view of the first section in FIG. 1 taken along line A-A.

As shown in FIGS. 4(a) to 4(d) and further in FIG. 2, the encapsulation sections 230 include respective flanges or returns indicated generally by reference 231. The flanges 231 are formed along the longitudinal edges and provide attachment points or surfaces for connecting to the inner metallic duct 210 and the outer metallic casing 240. For a rectangular or square duct configuration, the encapsulation sections or caps 230 comprise four sections 230a, 230b, 230c and 230d as depicted in FIG. 2. The sections 230 can be joined using an overlap connection as shown in FIG. 5(a), an overlap connection as shown in FIG. 5(b) or a mitered connection as shown in FIG. 5(c). The encapsulation sections 230 can have various cross-sections or profiles formed from solid or perforated material and will vary on the insulation material 440 being used and the required thickness of section 230. As shown in FIG. 4(a) and also FIG. 3, the encapsulation section 230 comprises a flat or straight cross-section and is joined or connected to the inner duct 210 and the outer casing 240 utilizing and overlap or butt connection. The upper flange indicated by reference 231a is connected or affixed to the outer casing 240 using a fastener 450, for instance comprising a screw, a rivet or the like. For configurations where the encapsulation section 230 does not provide sufficient thermal resistance to prevent the outer casing 240 from exceeding thermal limitations according to test standards, an insulating gasket indicated by reference 452 can be installed on the face of the flange 231a and thereby thermally separate the encapsulation section 230 from the outer casing 240 and provide a thermal bridge. The encapsulation section 230 is connected or affixed to the inner duct 210 by welding the lower flange 231b to face or surface of the inner duct 210 by welding, for example, using stitch, continuous, seam or spot welding techniques. If the insulation 440 comprises a gas or a flowable material, then the seams between the encapsulation section 230, the inner duct 210 and the outer casing 240 are sealed with a high temperature sealant 810 (FIG. 8) to prevent the insulation material 440 from flowing from the space or void 430.

Figure 4B:
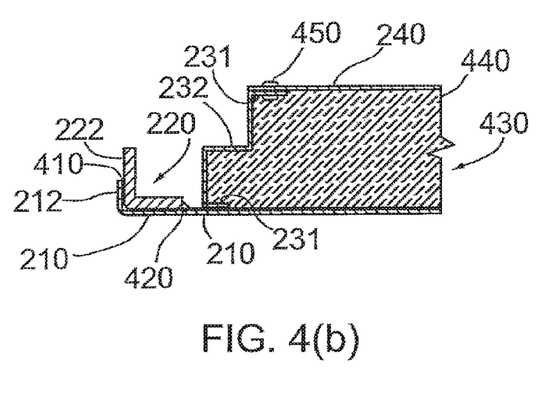
Figure 4C:
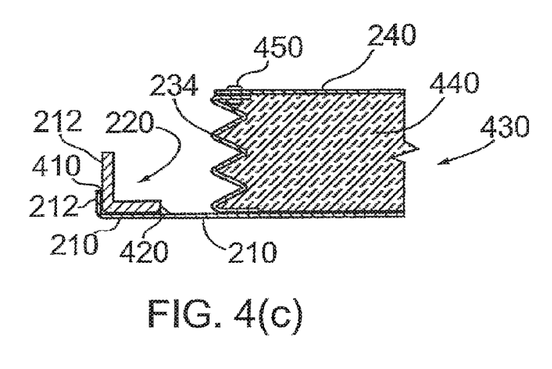
Figure 4D:
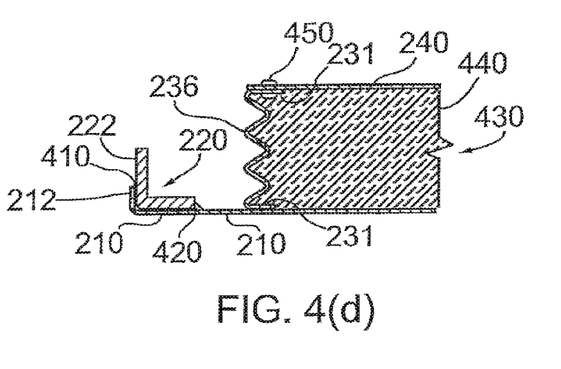
Figure 5A:
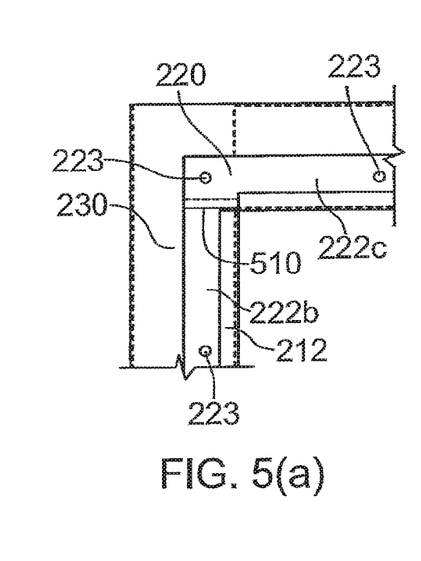
FIGS. 5(a) to 5(c) show alternate configurations for finishing the incapsulation sections and flanges at the corners of the section according to embodiments of the present invention.
Figure 5B:
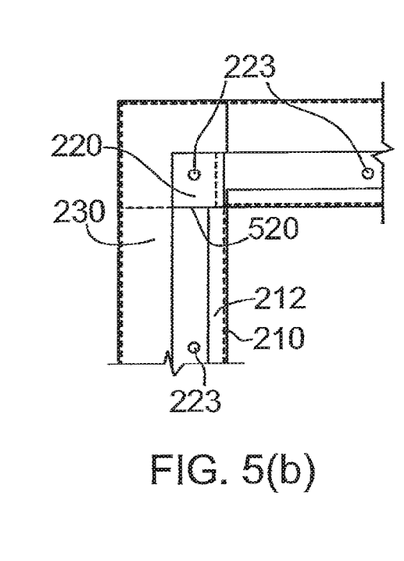
Figure 5C:
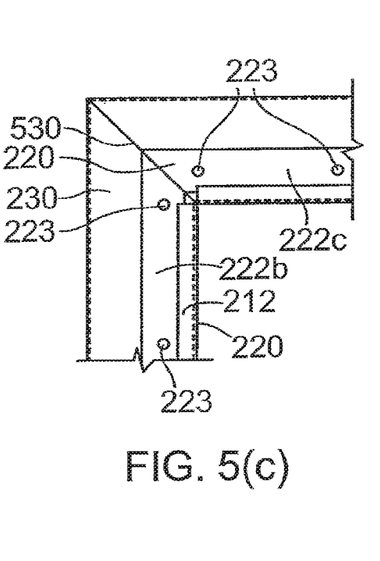

In addition to the straight or flat profile shown in FIG. 4(a), the encapsulation section can comprise a stepped profile as indicated generally by reference 232 and shown in FIG. 4(b), a saw tooth profile as indicated by reference 234 in FIG. 4(c), or an accordion profile as indicated by reference 236 in FIG. 4(d). By changing the profile of the encapsulation section 230, the surface area and thermal properties can be varied and will be determined by the insulation material 440 being utilized. For a flat or straight profile, the encapsulation sections 230 can be joined using any one of the configurations shown in FIGS. 5(a) to 5(c). For a stepped profile 232, the encapsulation sections 230 is joined using the mitered configuration shown in FIG. 5(c). For the sawtooth profile 234 and the accordion profile 236, the encapsulation sections 230 can be joined using the overlap connection configuration of FIG. 5(a) or the mitered connection configuration of FIG. 5(c).

At the fabrication facility or factory, the order of assembly of the insulation encapsulation sections 230, the inner metallic duct 210 and the outer metallic casing 240 will depend largely on the type of insulation material 440 being used to fill the void or space 430. For instance, if the insulation material 440 comprises a blanket or batt type material, then the encapsulation sections 230 can be installed at both exterior flange connections 220 for a duct section 110 and the insulation can be friction fitted into place with the outer metallic casing 240 installed over the insulation 440. If the insulation material 440 comprises a flowable material, but not a gaseous compound, the encapsulation sections 230 can be installed on one end of the exhaust duct section 110, and the duct section 110 positioned vertically and the flowable insulation material 440 poured to fill the void 430 (FIG. 4) and then the encapsulation sections 230 installed into place. If the insulation material 440 comprises a gaseous compound, then the encapsulation sections 230 are installed or connected to both ends of the exhaust duct section 110 and a sealant is also utilized to improve an air-tight seal in the void 430. After the sealant has sufficiently cured, air in the void 430 is evacuated while at the same time injecting insulating gas, until the required concentration of insulating gas is achieved.

Figure 7:
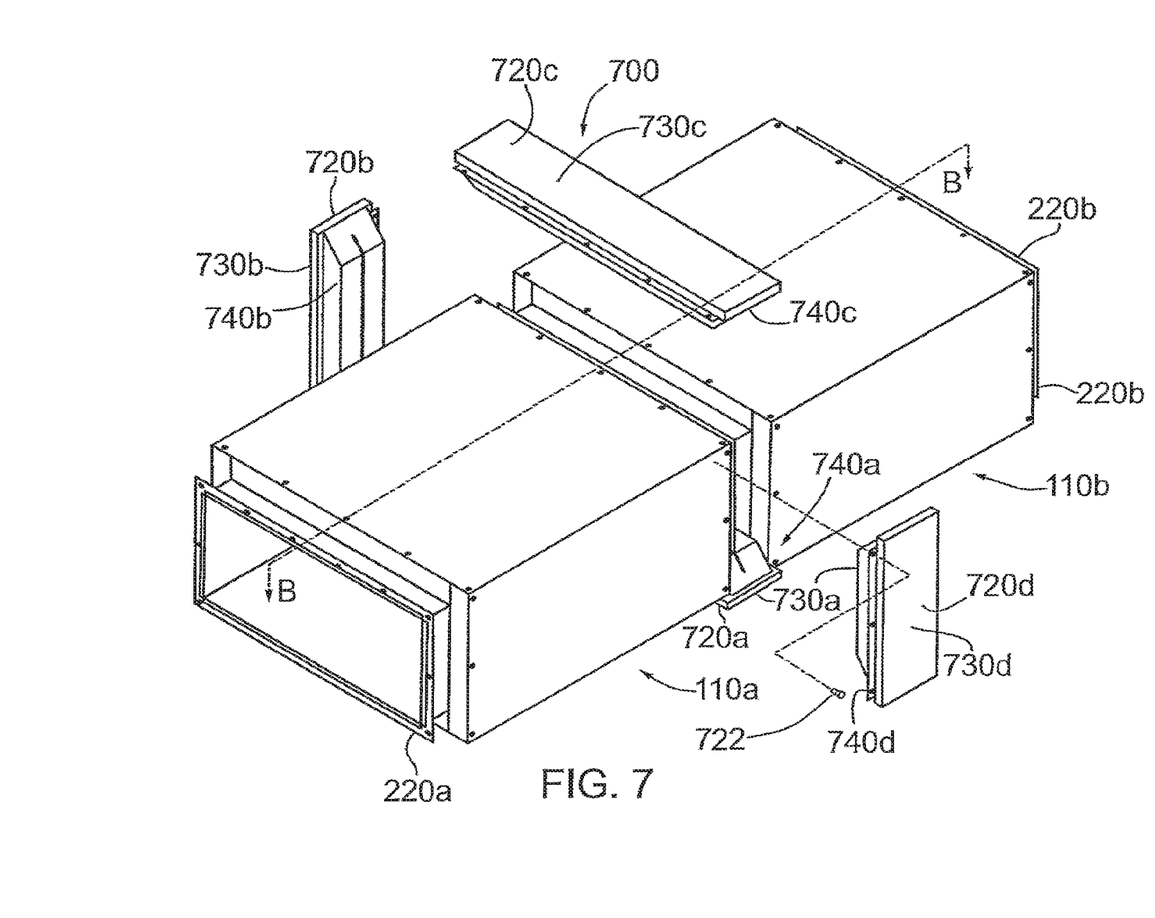
FIG. 7 is a perspective of the inner exhaust liner of FIG. 6 showing a configuration for thermally encasing the mechanical joint between the first and second modular sections according to an embodiment of the present invention.
Figure 8:
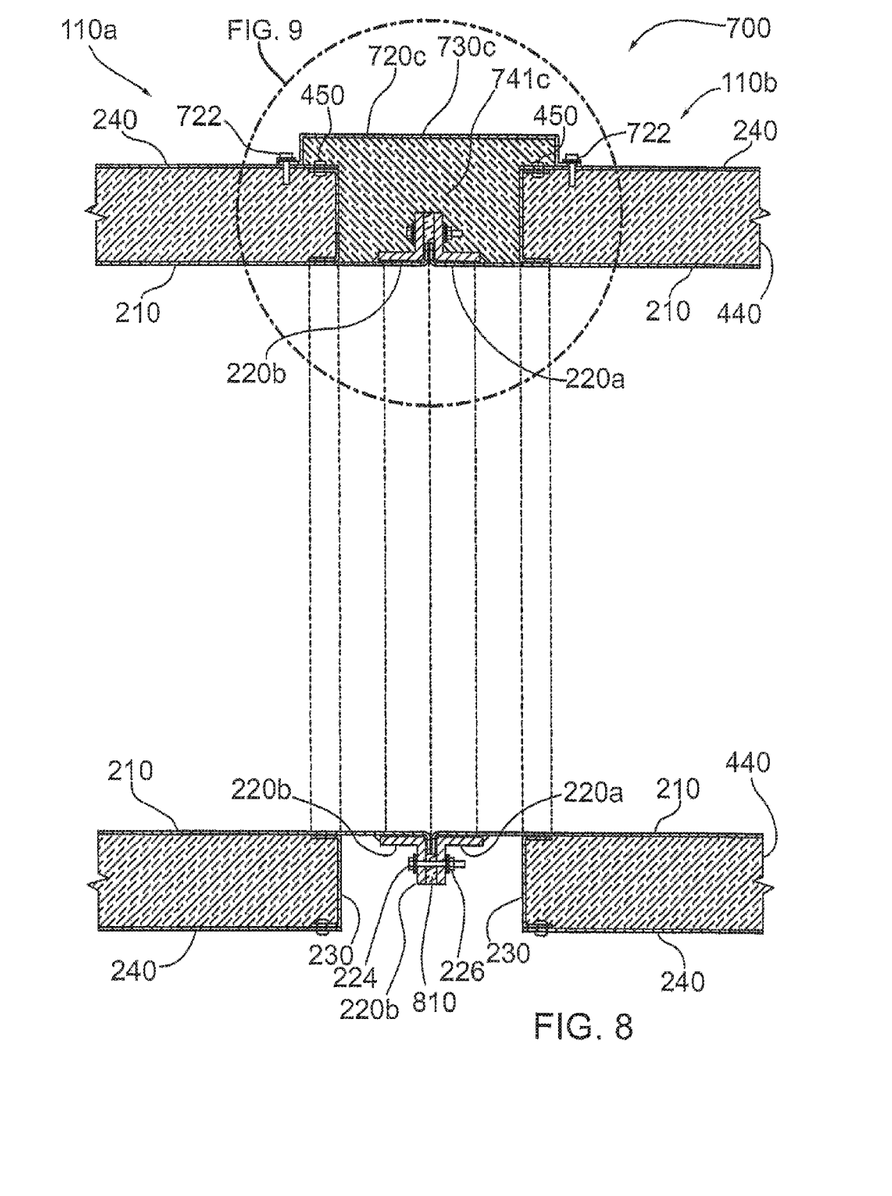
FIG. 8 is a longitudinal sectional view of the inner exhaust liner of FIG. 7 taken through line B-B.
Figure 9:
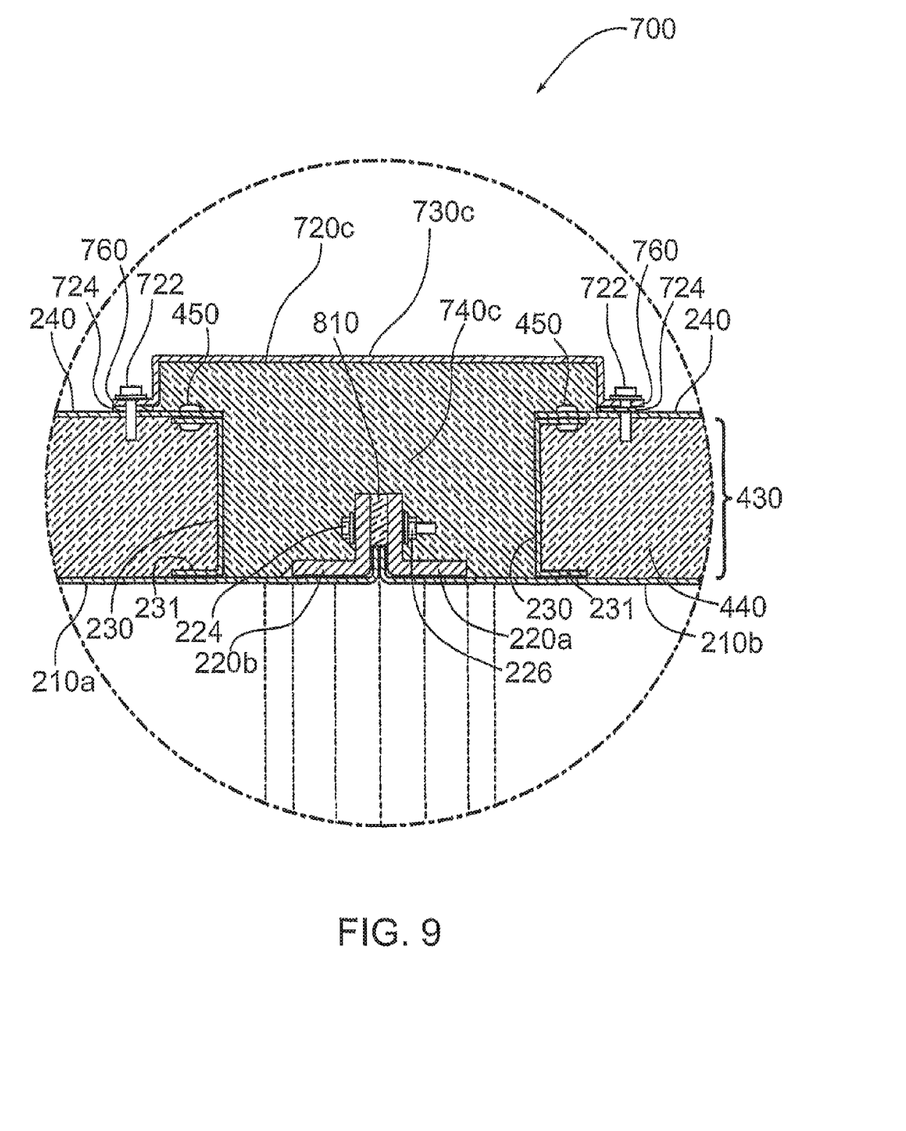
FIG. 9 is a partial and enlarged view of the joint encasement, i.e. the encased mechanical joint, for the inner exhaust liner of FIG. 7.

Reference is made back to FIG. 1. As shown in FIG. 1, the two exhaust sections 110a and 110b are joined or coupled together by the mechanical joint 120. According to an embodiment, the mechanical joint 120 comprises a joint encasement having a configuration as shown in FIGS. 7, 8 and 9, and is indicated generally by reference 700. The joint encasement 700 is configured to encase or surround the joint formed between two adjacent exhaust duct sections 110a and 110b when the exterior flange connectors 220 are connected together, for example, bolted.

As shown in FIG. 7, joint encasement 710 comprises four sections 720, indicated individually by references 720a, 720b, 720c and 720d. Each of the sections 720 comprises an outer metallic layer 730 and an insulating material (or layers of insulating material) 740. The insulating material 740 is affixed to the inner face or side of the outer metallic layer 730 using suitable adhesives and/or mechanical fasteners, in order to provide for pre-fabrication at the factory and thereby minimize the number of components transported to and assembled on site. According to an embodiment, the outer metallic layer 730 comprises a flat piece of steel fabricated from the same type and gauge of metal used to fabricate the outer metallic casing 240 (FIG. 1). As shown in FIGS. 8 and 9, the outer metallic layer 730 has a width sufficient to overlap and extend past the fasteners 450 that connect the respective encapsulation sections 230 to the outer metallic casing 240. The joint encasement sections 720 can comprise low profile configurations where the fasteners 450 comprise low profile fasteners, such as, rivets or spot welds. According to another aspect, the sections 720 having longitudinal edges formed with a safety or hemmed edge in order to stiffen the edge so that it lies flat against the outer metallic casing 240 when installed.

As shown in FIGS. 8 and 9, the joint encasement sections 720 comprise a hat configuration having a channel-like configuration with flanges or returns 760 formed outward from the legs of the channel to create an attachment surface or points for connecting to the outer metallic casing 240 using fasteners 722, for example, screws, through holes (i.e. punched through holes) in the flanges 760. According to another aspect, a thermal gasket indicated by reference 724 in FIG. 9 can be included to thermally isolate the joint encasement sections 720 from the outer metallic casing 240.

Figure 6:
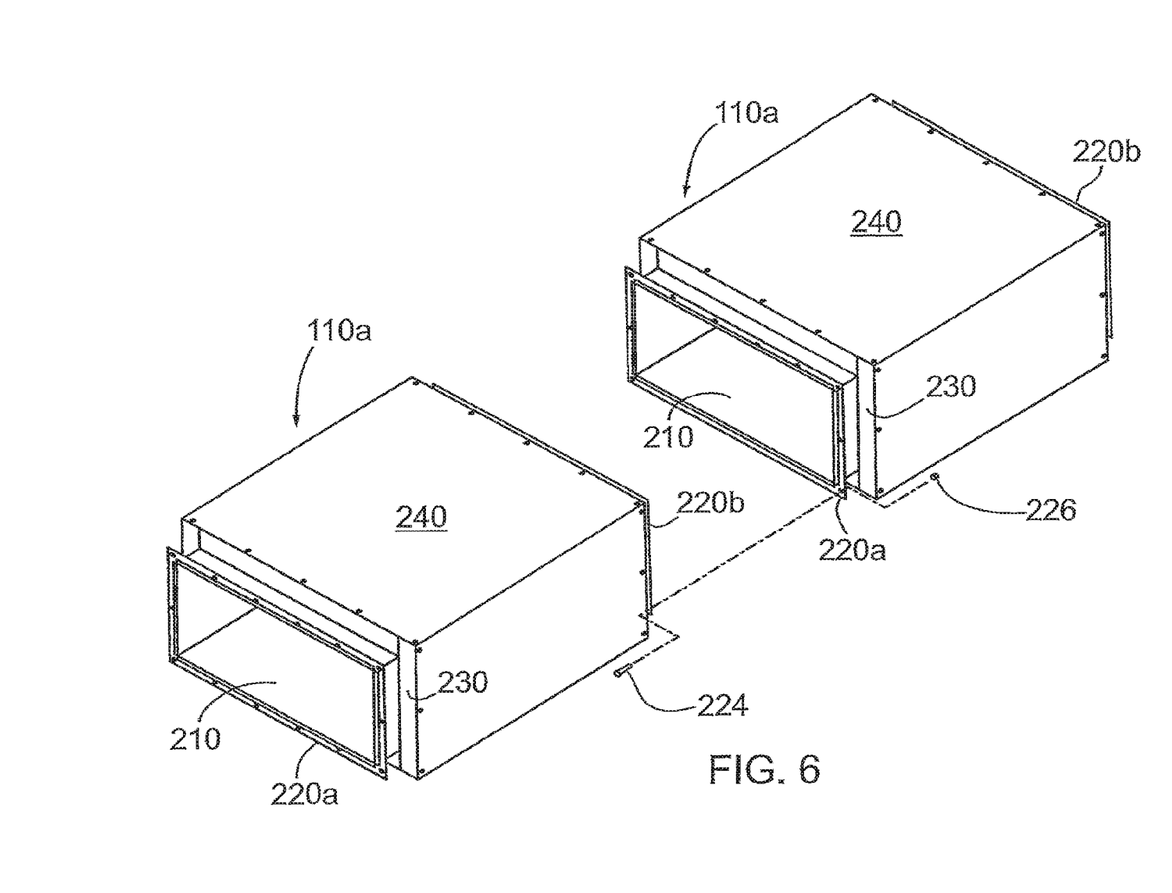
FIG. 6 is a perspective view of an inner exhaust liner comprising first and second modular sections and the configuration for joining the two sections according to an embodiment of the present invention.

In accordance with an exemplary embodiment, the fire-rated exhaust duct sections 110 and encasement joint 120 is fabricated and assembled on a component level as described above in the factory and delivered to the installation site. According to an exemplary embodiment, a 0.250 to 0.500 inch diameter bead of high temperature sealant 810 is applied is applied to the face of one of the exterior flange connectors 220 adjacent the edge of the flange or return 212 (FIG. 4(*a*)) on the inner metallic duct 210. The second duct section 110*b* is aligned with the first duct section 110*a* and brought together so that the faces of the flanges 212 on both of the inner metallic ducts 210 are in contact. The bolts 224 (FIG. 6) are then installed through each hole in the exterior flange connector 220 and the bolts 224 are secured by the nuts 226 (FIG. 6). The fasteners are tightened in a circular and progressive manner to a torque setting defined by the exhaust duct manufacturer's specifications. Once the adjacent exhaust duct sections 110*a* and 110*b* are connected together, the encapsulation sections 230 are installed, one side at a time, until all four of the sections 230 have been installed. If the void 430 is to be filled with insulation 440, the insulation 440 is put into place before installation of the encapsulation sections 230, as described above. Each of the joint encasement sections 720 is inserted into position and pressed down until the outer metallic layer 730 comes into contact with the surface of the outer metallic casing 240. The joint encasement section 720 is secured by drilling holes through the flanges 760 and threading screws 722 into the outer metallic casing 240 as described above.

In summary and according to another embodiment, the present invention comprises an exhaust duct system comprising a plurality of individual duct sections which are factory fabricated and then mechanically assembled on site. This eliminates the need to do on site fabrication of the duct sections, e.g. welding and other hot work. The exhaust sections are connected together to form longer sections and runs to create a fire-rated exhaust duct system in a building or other type of facility for exhausting or moving flammable or hazardous gases, vapours and materials from an originating source, e.g. an exhaust hood or another duct inlet, to a location where the flammable or hazardous gases, vapours or materials can be safely discharged, for example into the atmosphere, or into a collection or treatment system.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An inner duct liner for a fire-rated exhaust module having an outer casing and first and second external flange connectors, said inner duct liner comprising:
    one or metallic sections formed into a tubular structure with a defined cross-sectional shape and comprising a first transversal end and a second transversal end;
    each of said metallic sections having a longitudinal edge, and the longitudinal edges of adjacent metallic sections being joined together utilizing a connection mechanism to form an air tight and liquid seal between the longitudinal edges;
    said first transversal end including a flange configured to be affixed to the first external flange connector; and
    said second transversal end including a flange configured to be affixed to the second external flange connector.

2. The inner duct liner as claimed in claim 1, wherein said connection mechanism comprises a continuous weld along the longitudinal edge of said metallic section.

3. The inner duct liner as claimed in claim 1, wherein said connection mechanism comprises a pocket mechanical lock sealed with stitch welding.

4. The inner duct liner as claimed in claim 2, wherein said cross-sectional shape comprises one of a square profile, a rectangular profile, a circular profile and an oval profile.

5. The inner duct liner as claimed in claim 2, wherein said one or more metallic sections comprise two pieces of metal, each formed into a L-shaped section and joined together to form a generally rectangular or square cross-sectional shape.

6. The inner duct liner as claimed in claim 5, wherein said metallic material comprises one of an 18 gauge stainless steel material and a sixteen gauge carbon steel material.

7. The inner duct liner as claimed in claim 6, wherein the first external and the second external flange connectors are formed from said same metallic material, so as to avoid galvanic action occurring between dissimilar metals.

8. The inner duct liner as claimed in claim 2, wherein said one or more metallic sections comprise four pieces of flat metal, and joined together to form a generally rectangular or square cross-sectional shape.

9. The inner duct liner as claimed in claim 2, wherein the flange on said first transversal end and the flange on said second transversal end are welded to the first external flange connector and the second external flange connector to form an air tight and liquid seal between adjacent joining surfaces.

10. An inner duct liner for a fire-rated exhaust module having an outer casing and first and second external flange connectors, said inner duct liner comprising:
    a plurality of metallic sections formed into a structure having a generally rectangular cross-sectional shape and comprising a first transversal end and a second transversal end;
    each of said metallic sections having a longitudinal edge, and the longitudinal edges of adjacent metallic sections being joined together utilizing a continuous weld to form an air tight and liquid seal between the longitudinal edges;

said first transversal end including a flange configured to be affixed to the first external flange connector;

said second transversal end including a flange configured to be affixed to the second external flange connector;

said metallic sections being formed from a metallic material the same as the first and second external flange connectors, so as to avoid galvanic action.

11. The inner duct liner as claimed in claim 10, wherein said metallic material comprises 18 gauge stainless steel.

12. The inner duct liner as claimed in claim 10, wherein said metallic material comprises 16 gauge carbon steel.

13. The inner duct liner as claimed in claim 10, wherein the flange on said first transversal end and the flange on said second transversal end are welded to the first external flange connector and the second external flange connector to form an air tight and liquid seal between adjacent joining surfaces.

\* \* \* \* \*